US009906548B2

(12) United States Patent
Lee et al.

(10) Patent No.: US 9,906,548 B2
(45) Date of Patent: *Feb. 27, 2018

(54) MECHANISM TO AUGMENT IPS/SIEM EVIDENCE INFORMATION WITH PROCESS HISTORY SNAPSHOT AND APPLICATION WINDOW CAPTURE HISTORY

(71) Applicant: International Business Machines Corporation, Armonk, NY (US)

(72) Inventors: Chien Pang Lee, Taipei (TW); Hariharan Mahadevan, Taipei (TW)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/291,107

(22) Filed: Oct. 12, 2016

(65) Prior Publication Data
US 2017/0034202 A1   Feb. 2, 2017

Related U.S. Application Data

(63) Continuation of application No. 15/248,012, filed on Aug. 26, 2016, which is a continuation of application
(Continued)

(51) Int. Cl.
*H04L 29/06* (2006.01)
*G06F 17/30* (2006.01)
(Continued)

(52) U.S. Cl.
CPC ........ *H04L 63/1433* (2013.01); *G06F 3/0487* (2013.01); *G06F 17/30858* (2013.01);
(Continued)

(58) Field of Classification Search
CPC ............. H04L 63/1433; H04L 63/1416; H04L 63/1425; G06F 3/0487; G06F 17/30858;
(Continued)

(56) References Cited

U.S. PATENT DOCUMENTS 7,428,611 B1 * 9/2008 Todd ................... H04L 67/1097
711/108
7,530,106 B1   5/2009 Laitsev et al.
(Continued)

OTHER PUBLICATIONS

Gordon, "Operationalizing Information Security: Putting the Top 10 SIEM Best Practices to Work," Process, Metrics and Technology Consideration, 2010, p. 1-29.
(Continued)

*Primary Examiner* — Hadi Armouche
*Assistant Examiner* — Sakinah Taylor
(74) *Attorney, Agent, or Firm* — Erik K. Johnson

(57) ABSTRACT

A method to augment a plurality of IPS or SIEM evidence information is provided. The method may include monitoring a plurality of processes associated with a computer system. The method may also include identifying a plurality of processes that have network activity. The method may further include capturing the identified plurality of processes that have network activity. The method may also include storing the identified captured plurality of processes that have network activity. The method may include monitoring a plurality of selected programs associated with an operating system of the computer system. The method may also include identifying a plurality of selected programs that have network activity. The method may further include capturing a plurality of screen capture images associated with the identified plurality of selected programs. The method may include storing, by the second component the captured plurality of system process activity.

4 Claims, 8 Drawing Sheets

Related U.S. Application Data

No. 14/716,961, filed on May 20, 2015, now Pat. No. 9,525,695, which is a continuation of application No. 14/662,292, filed on Mar. 19, 2015, now Pat. No. 9,509,709.

(51) Int. Cl.
   *G06F 21/55* (2013.01)
   *G06F 3/0487* (2013.01)
   *G06F 21/57* (2013.01)

(52) U.S. Cl.
   CPC ...... *G06F 17/30864* (2013.01); *G06F 21/554* (2013.01); *G06F 21/577* (2013.01); *H04L 63/1416* (2013.01); *H04L 63/1425* (2013.01); *G06F 2221/033* (2013.01)

(58) Field of Classification Search
   CPC ............. G06F 17/30864; G06F 21/554; G06F 21/577; G06F 2221/033
   USPC .......................................................... 726/23
   See application file for complete search history.

(56) References Cited

U.S. PATENT DOCUMENTS

| | | | |
|---|---|---|---|
| 7,595,816 | B1 | 9/2009 | Enright et al. |
| 8,214,905 | B1* | 7/2012 | Doukhvalov ............ H04L 63/20 726/24 |
| 8,881,272 | B2 | 11/2014 | Bunker et al. |
| 9,507,944 | B2* | 11/2016 | Lotem ..................... G06F 21/55 |
| 2006/0036862 | A1* | 2/2006 | Tuvell ................. G06F 21/6218 713/171 |
| 2006/0059554 | A1 | 3/2006 | Akerman |
| 2008/0301284 | A1* | 12/2008 | Demarest ............... G06Q 10/10 709/224 |
| 2009/0164522 | A1 | 6/2009 | Fahey |
| 2011/0289108 | A1* | 11/2011 | Bhandari .......... G06F 17/30905 707/769 |
| 2013/0298243 | A1 | 11/2013 | Kumar et al. |
| 2014/0059683 | A1 | 2/2014 | Ashley |
| 2014/0215621 | A1 | 7/2014 | Xaypanya et al. |
| 2014/0223563 | A1 | 8/2014 | Durie et al. |
| 2014/0283083 | A1 | 9/2014 | Gula et al. |
| 2014/0298403 | A1* | 10/2014 | Qureshi .................. G06F 21/41 726/1 |
| 2014/0351233 | A1* | 11/2014 | Crupi ................ G06F 17/30516 707/706 |
| 2015/0064677 | A1 | 3/2015 | Baphna et al. |
| 2015/0264011 | A1 | 9/2015 | Liang |

OTHER PUBLICATIONS

Kibirkstis, "What is the Role of a SIEM in Detecting Events of Interest?," SANS, Nov. 2009, p. 1, SANA™ Institute, http://www.sans.org/security-resources/idfaq/siem.php, Accessed on Feb. 25, 2015.

Lee et al., "Mechanism to Augment IPS/SIEM Evidence Information With Process History Snapshot and Application Window Capture History," filed Mar. 19, 2015, p. 1-36, U.S. Appl. No. 14/662,292.

Mell et al., "The NIST Definition of Cloud Computing," National Institute of Standards and Technology, Information Technology Laboratory, Oct. 7, 2009, Version 15.

Lee et al., "Mechanism to Augment IPS/SIEM Evidence Information With Process History Snapshot and Application Window Capture History," filed May 20, 2015, p. 1-33, U.S. Appl. No. 14/716,961.

Lee et al., "Mechanism to Augment IPS/SIEM Evidence Information With Process History Snapshot and Application Window Capture History," filed Aug. 26, 2016, p. 1-37, U.S. Appl. No. 15/248,012.

IBM, List of IBM Patents or Patent Applications Treated as Related, Appendix P, dated Oct. 17, 2016, 2 pages.

Pending U.S. Appl. No. 15/248,012, filed Aug. 26, 2016, Entitled: "Mechanism to Augment IPS/SIEM Evidence Information With Process History Snapshot and Application Window Capture History".

Pending U.S. Appl. No. 14/716,961, filed May 20, 2015, Entitled: "Mechanism to Augment IPS/SIEM Evidence Information With Process History Snapshot and Application Window Capture History".

Pending U.S. Appl. No. 14/662,292, filed Mar. 19, 2016, Entitled: "Mechanism to Augment IPS/SIEM Evidence Information With Process History Snapshot and Application Window Capture History".

\* cited by examiner

MECHANISM TO AUGMENT IPS/SIEM EVIDENCE INFORMATION WITH PROCESS HISTORY SNAPSHOT AND APPLICATION WINDOW CAPTURE HISTORY

BACKGROUND

The present invention relates generally to the field of computers, and more particularly to software vulnerabilities.

Hackers are constantly on the lookout for vulnerabilities in software that they can exploit. Exploiting a vulnerability typically involves a series of actions. If the machine is installed with a network intrusion prevention software (IPS) or Security Information and Event Management software (SIEM) and if the vulnerability pattern is known to it, IPS/SIEM would detect the attempt to exploit the vulnerability and take an appropriate action to counter the attack. As part of this counter measure, IPS/SIEM typically also logs the relevant packet/event information so that it can subsequently be used for analysis to trace the attack.

SUMMARY

According to one embodiment, a method to augment a plurality of IPS or SIEM evidence information is provided. The method may include monitoring a plurality of processes associated with a computer system. The method may also include identifying a plurality of processes within the monitored plurality of processes that have network activity. The method may further include capturing the identified plurality of processes that have network activity. The method may also include storing the identified captured plurality of processes that have network activity. The method may include monitoring a plurality of selected programs associated with an operating system of the computer system. The method may also include identifying a plurality of selected programs within the monitored plurality of selected programs that have network activity. The method may further include capturing a plurality of screen capture images associated with the identified plurality of selected programs. The method may include storing the captured plurality of system process activity.

According to another embodiment, a computer system to augment a plurality of IPS or SIEM evidence information is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include monitoring a plurality of processes associated with a computer system. The method may also include identifying a plurality of processes within the monitored plurality of processes that have network activity. The method may further include capturing the identified plurality of processes that have network activity. The method may also include storing the identified captured plurality of processes that have network activity. The method may include monitoring a plurality of selected programs associated with an operating system of the computer system. The method may also include identifying a plurality of selected programs within the monitored plurality of selected programs that have network activity. The method may further include capturing a plurality of screen capture images associated with the identified plurality of selected programs. The method may include storing the captured plurality of system process activity.

According to yet another embodiment, a computer program product to augment a plurality of IPS or SIEM evidence information is provided. The computer program product may include one or more computer-readable storage devices and program instructions stored on at least one of the one or me tangible storage devices, the program instructions executable by a processor. The computer program product may include program instructions to monitor a plurality of processes associated with a computer system. The computer program product may also include program instructions to identify a plurality of processes within the monitored plurality of processes that have network activity. The computer program product may further include program instructions to capture the identified plurality of processes that have network activity. The computer program product may also include program instructions to store the identified captured plurality of processes that have network activity. The computer program product may include program instructions to monitor a plurality of selected programs associated with an operating system of the computer system. The computer program product may also include program instructions to identify a plurality of selected programs within the monitored plurality of selected programs that have network activity. The computer program product may further include program instructions to capture a plurality of screen capture images associated with the identified plurality of selected programs. The computer program product may include program instructions to store the captured plurality of system process activity.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
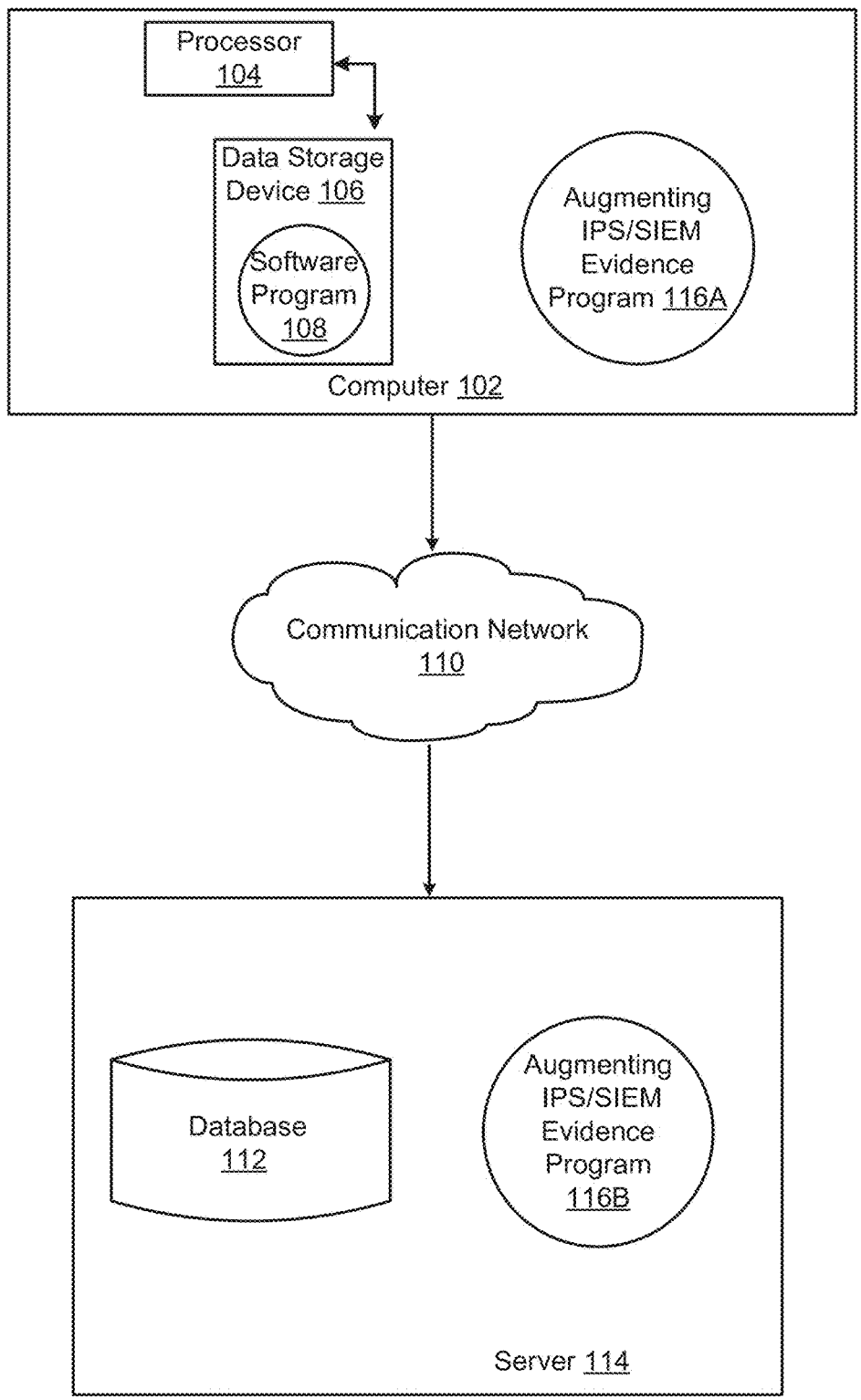
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to software vulnerabilities. More specifically, the present embodiment relates to augmenting the IPS/SIEM with two software components that continually monitor, capture, and store various processes in the system and window captures of selected programs in the operating system (OS). Therefore, the present embodiment has the capacity to improve the technical field of software vulnerabilities by providing valuable clues as to what actions were performed immediately prior to the detected attack.

As previously described, network intrusions are getting increasingly complex and sophisticated and are routinely performed from third-party systems which are compromised. Attacks can also come from a malicious user who is given legitimate access to the resources. Endpoint IPS is designed to detect and blocks intrusions, and when they do so, they capture the network packet where the malicious content was detected. As such, this captured packet may be used for attack analysis. As part of this counter measure, IPS/SIEM typically also logs the relevant packet/event information so that it can subsequently be used for analysis to trace the attack. Though such dumps itself provide valuable data for forensic analysis, tracing back the steps taken by the hacker that eventually allowed them to exploit the vulnerability can provide invaluable information, information that can be used to address the root vulnerability and sometimes act as legal evidence for prosecution. Examples for such information include, but not limited to, a history of system programs or commands that were used when the exploit was detected. However, currently IPS/SIEM systems do not provide a means to supplement exploit dumps with such historical information. Furthermore, the captured network packet with malicious content alone may not be not enough since often the detected attack is preceded by another attack or illegitimate action. Therefore, knowing the process and application window capture history can provide valuable clues as to what actions were performed immediately prior to the detected attack. As such, it may be advantageous, among other things, to provide a mechanism to augment IPS/SIEM evidence information with process history snapshot and application window capture history.

According to at least one implementation, the present embodiment may augment the IPS/SIEM with two software components. As such, one component may continuously monitor various processes in the system, take a routine system process snapshot, and store the snapshots indexed by the time of snapshot (i.e., the process snapshot history cache). The second component may routinely monitor selected programs in the OS and maintain a cache of screen capture images of the program's window(s). Only processes that have network activity may have their application windows tracked and such processes are identified by the IPS which has full visibility of the network traffic. The window capture images may then be indexed by process id and may be available for retrieval by the IPS/SIEM whenever it needs them (i.e., the screen capture history cache). Thereafter, whenever the IPS/SIEM detects an attack, it can query these caches for the relevant process' information and attach these data together with the packet capture dump, packaging it all into a single binary large object (BLOB). Therefore, by correlating the IPS/SIEM events, network packets, screen captures and process history snapshots, security administrators may be well positioned to extrapolate the targets and consequences of attacks as well as providing supporting evidence.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to augment IPS/SIEM evidence information with process history snapshot and application window capture history. According to at least one implementation, the present embodiment may augment endpoint IPS with two components that monitor, routinely capture and store in a cache application window content for programs with network activity and system process activity snapshot history information. As such, the cyclic cache may contain the most recent captures until the cache size is exhausted so that memory over consumption may be prevented.

Furthermore, when IPS detects a malicious packet, and logs the packet, it may query the above components, dump their cached data together with the network packet. Then the three data above may be grouped together (e.g.: as a ZIP file) with appropriate timestamps to produce a timeline of historical activity for administrators to trace back. As such, the grouped data may be hyperlinked to the respective attack event generated by IPS for easy reference and access.

Additionally, memory assigned to store capture history is typically limited and therefore can be used up quickly. However, certain processes in the system can be identified as being more vulnerable than others for an attack and therefore those processes ought to be monitored for a longer window than others. Therefore, the present embodiment may provide a mechanism to optimize window capture cache memory usage by assigning weights to relevant processes in the OS. Thus, calculated weights may be used to allocate more of the cache memory to processes with higher weight. According to at least one implementation, an example of the weight assignment mechanism may be as follows:

when a program opens/closes a client socket, incr/decr its weight by 1
when a program opens/closes a server socket incr/decr its weight by 2
when a program opens/closes a datagram socket, incr/decr its weight by 1
when a program opens/closes a raw socket, incr/decr its weight by 5
when a program opens/closes unknown socket type, incr/decr its weight by 2
when a program processes user input, increment its weight by 1
when a program runs with elevated privileges (root in *Nix, Administrator in Windows),
increment its weight by 2
when a program modifies permissions of resources, increment its weight by 1

According to the present embodiment, the system may maintain a table of tracked processes and its corresponding weight calculated as per above.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an Augmenting IPS/SIEM Evidence Program 116A. The networked computer environment 100 may also include a server 114 that is enabled to run an Augmenting IPS/SIEM Evidence Program 116B that may interact with a database 112 and a communication network 110. The networked computer environment 100 may include a plurality of computers 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 114 via the communications network 110. The communications network 110 may include connections, such as wire, wireless communication links, or fiber optic cables. As will be discussed with reference to FIG. 5, server computer 114 may include internal components 800a and external components 900a, respectively, and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing devices capable of running a program, accessing a network, and accessing a database 112. According to various implementations of the present embodiment, the Augmenting IPS/SIEM Evidence Program 116A, 116B may interact with a database 112 that may be embedded in various storage devices, such as, but not limited to a computer/mobile device 102, a networked server 114, or a cloud storage service. According to the present embodiment, the IPS/SIEM component on the local computer 102 communicates with the Augmenting IPS/SIEM Evidence Program 116A running on the local computer 102 when required. Similarly, the IPS/SIEM component on the server computer 114 will communicate with the Augmenting IPS/SIEM Evidence Program 116B running locally on the server computer.

According to the present embodiment, a user using a client computer 102 or a server computer 114 may use the Augmenting IPS/SIEM Evidence Program 116A, 116B (respectively) to augment IPS/SIEM evidence information with a process history snapshot and an application window capture history. As such, the Augmenting IPS/SIEM Evidence Program 116A, 116B, may augment endpoint IPS with two components (a process snapshot history component 202 (FIG. 2) and a screen capture snapshot history component 204 (FIG. 2) which will be described in further detail with respect to FIG. 2) that may monitor, routinely capture and store in a cache application window content for programs with network activity and system process activity snapshot history information. The Augmenting IPS/SIEM Evidence method is explained in more detail below with respect to FIGS. 2, 3 and 4A-4B.

Figure 2:
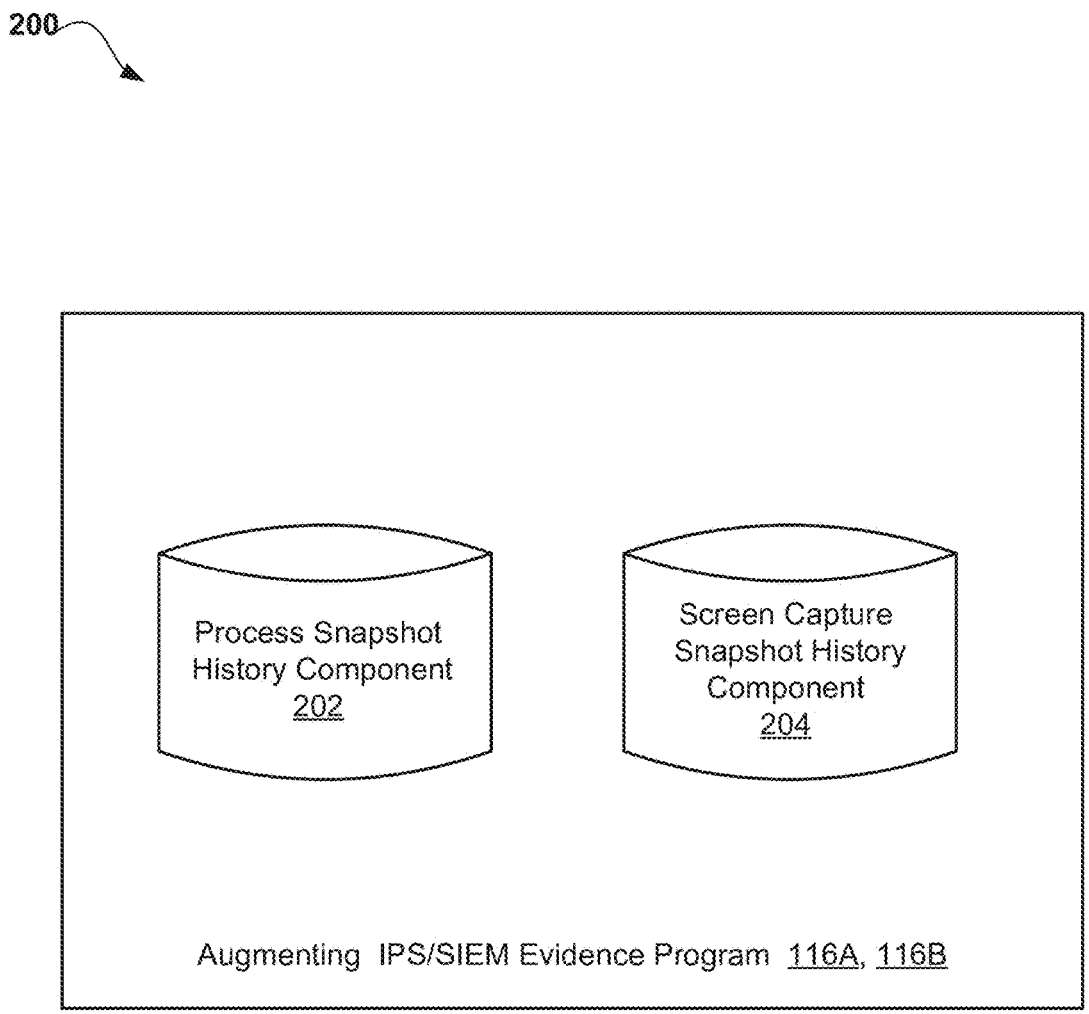
FIG. 2 is an exemplary illustration of the components associated with a program to augment IPS/SIEM Evidence according to at least one embodiment.

Referring now to FIG. 2, an exemplary illustration 200 of the components associated with the Augmenting IPS/SIEM Evidence Program according to at least one embodiment. According to at least one implementation, the Augmenting IPS/SIEM Evidence Program 116A, 116B, may require two components: the Process Snapshot History Component 202 and the Screen Capture Snapshot History Component 204. These two components may expose a well-defined external interface that the IPS/SIEM can use whenever it needs to extract information from them. As such, both these components may routinely query the active processes in the system and extract the relevant information storing it in an internal cache. According to at least one implementation, the Process Snapshot History Component 202 may query and store the active process list whereas the Screen Capture Snapshot History Component 204 may identify the graphical user interface (GUI) processes and store their window image captured from the operating system OS GUI compositor.

Modern operating systems employ window compositing to rasterize a GUI window image before it is made visible to the end-user. Compositing is a technique whereby the window's rasterized content is always maintained (even when the window is not visible) in off-screen device memory. Common compositing engines may include for example: Windows—Desktop Window Manager (DWM); OS X—Quartz Compositor; Linux—Compiz, Kwin, Xfwm, Enlightenment, and Wayland. According to the present embodiment, the Screen Capture Snapshot History Component 204 may interface with the compositing engine and record application's window contents as it changes into a snapshot history cache. As such, the IPS may inform the Screen Capture Snapshot History Component 204 as to the processes to monitor when it detects network activity that may help maximize cache memory utilization. Therefore, when the IPS detects an attack, it may request the Screen Capture Snapshot History Component 204 for the recorded window state images and dump them along with packet capture data.

Figure 3:
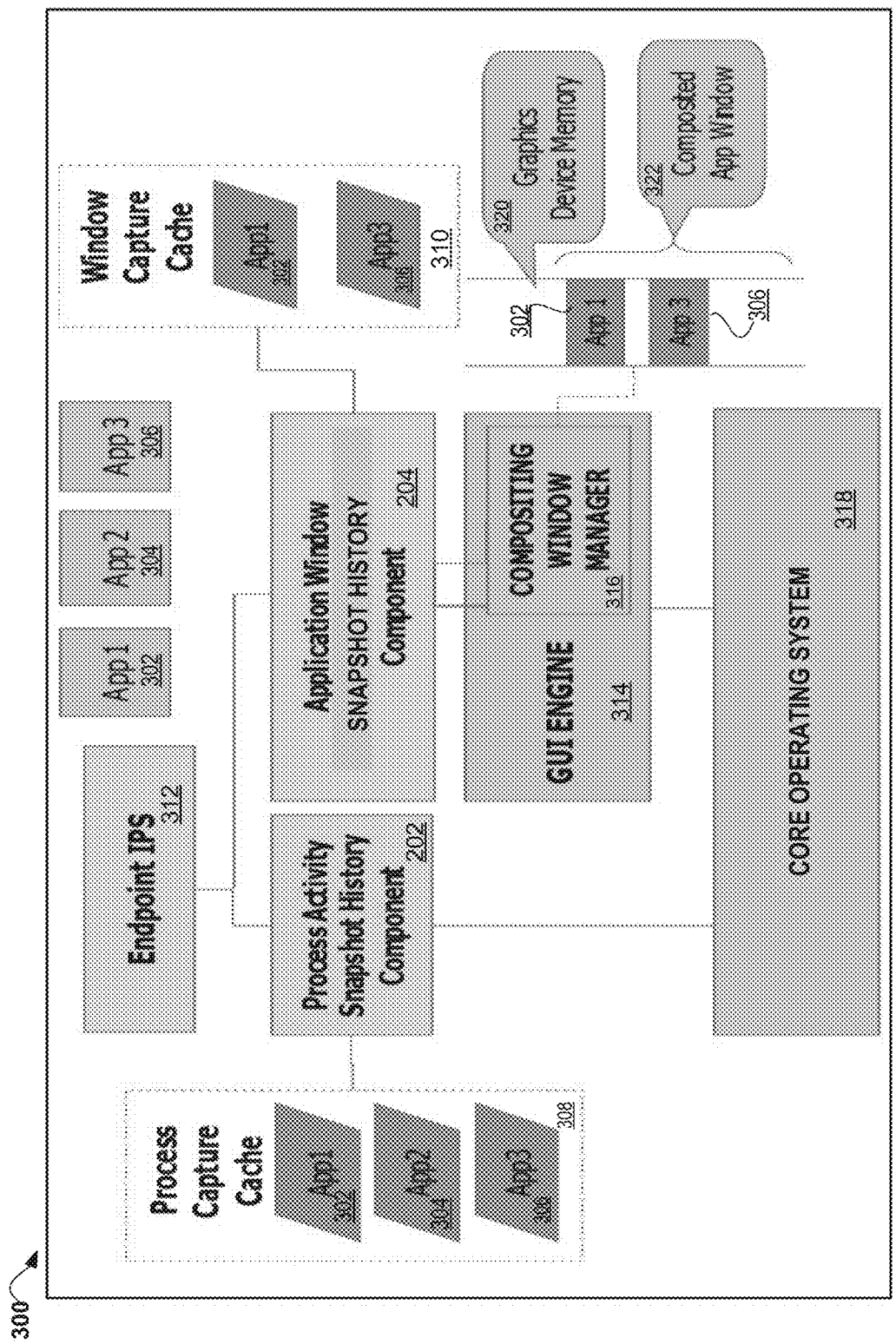
FIG. 3 is an exemplary illustration of an architecture diagram according to at least one embodiment.

Referring now to FIG. 3, an exemplary illustration of an architecture diagram 300 in accordance with one embodiment is depicted. According to the present embodiment, the Process Snapshot History Component 202 can be implemented by using the various operating system process status application program interface (API) to applications 302-306. In addition to a list of processes in the machine, this API to applications 302-306 can also provide additional information such as CPU usage, memory usage, etc. A visual sampling of the kind of information that can be extracted and stored may be similar to the output of 'top' command in Unix operating systems.

Additionally, the Screen Capture Snapshot History component 204 can be implemented by using the window compositor component API 322 that is part of modern operating systems 318. The compositor component 322 takes various names in various operating systems 318. As such, it may be called Wayland Compositor in Linux, Window Compositor in Windows, and Compositing Window Manager in OS X. This component 322 provides APIs 302-306 for external programs to query a window's current image (i.e., via a compositing window manager 316 that is part of a GUI Engine 314) and therefore, the Screen Capture History Component 204 can use this compositor component API 322 to retrieve and build its history cache 310. Note that as an optimization, to reduce the memory footprint 320, therefore, only changes to a windows image from its previous stored image, (i.e., the change delta) may need to be stored in the cache 310.

As such, both the Process Snapshot History component 202 and the Screen Capture Snapshot History Component 204 may apply a similar approach to storing the history 308, 310. Since only the immediate past from any given moment is of most interest in terms of evidence, the components 202, 204 may only record and store the historical data up to a maximum prefixed time interval in the past. In other words, the cache 308, 310 can be visualized as a sliding window cache, one that extends to a limited duration of time in the past at any given moment. As the pre-allocated cache memory is exhausted, records that are older may be replaced with new snapshot records that are taken. As such, the Augmenting IPS/SIEM Evidence Program 116A, 116B (FIG. 1) may manage the system without it consuming too much memory causing it to impede on system performance.

Furthermore, since window image capture can easily consume large amounts of memory and not all processes in a system pose the same level of risk, an optimization technique may also be employed by the present embodiment which may rate the various processes in the system in terms of their attack risk and assigns a corresponding risk weight. As such, processes with higher weight, and which therefore pose a higher vulnerability risk, may be given more of the cache memory allowing a longer history to be maintained for them. According to at least one implementation, the weight assigning mechanism may work on various parameters, such as the nature of network sockets opened (client/server), whether the processes receives user input, whether the process changes permissions, etc.

According to the present embodiment, when the IPS/SIEM component 312 detects an exploit, it may query the two components (i.e., the Process Snapshot History Component 202 and the Screen Capture Snapshot History Component 204) to retrieve its history data 308, 310. Depending on the exploit, IPS/SIEM 312 can decide whether to retrieve the entire history contents or only history for selected processes that it suspects as to most likely candidates to have been used by the malicious code or user who attempted the exploit. The collected data may then combined with the network packet capture and stored as single BLOB, employing a simple packaging system as ZIP or something similar. A reference to the thus created evidence BLOB may also be made in the event propagated to the management console allowing tracking of this evidence information.

Figure 4A:
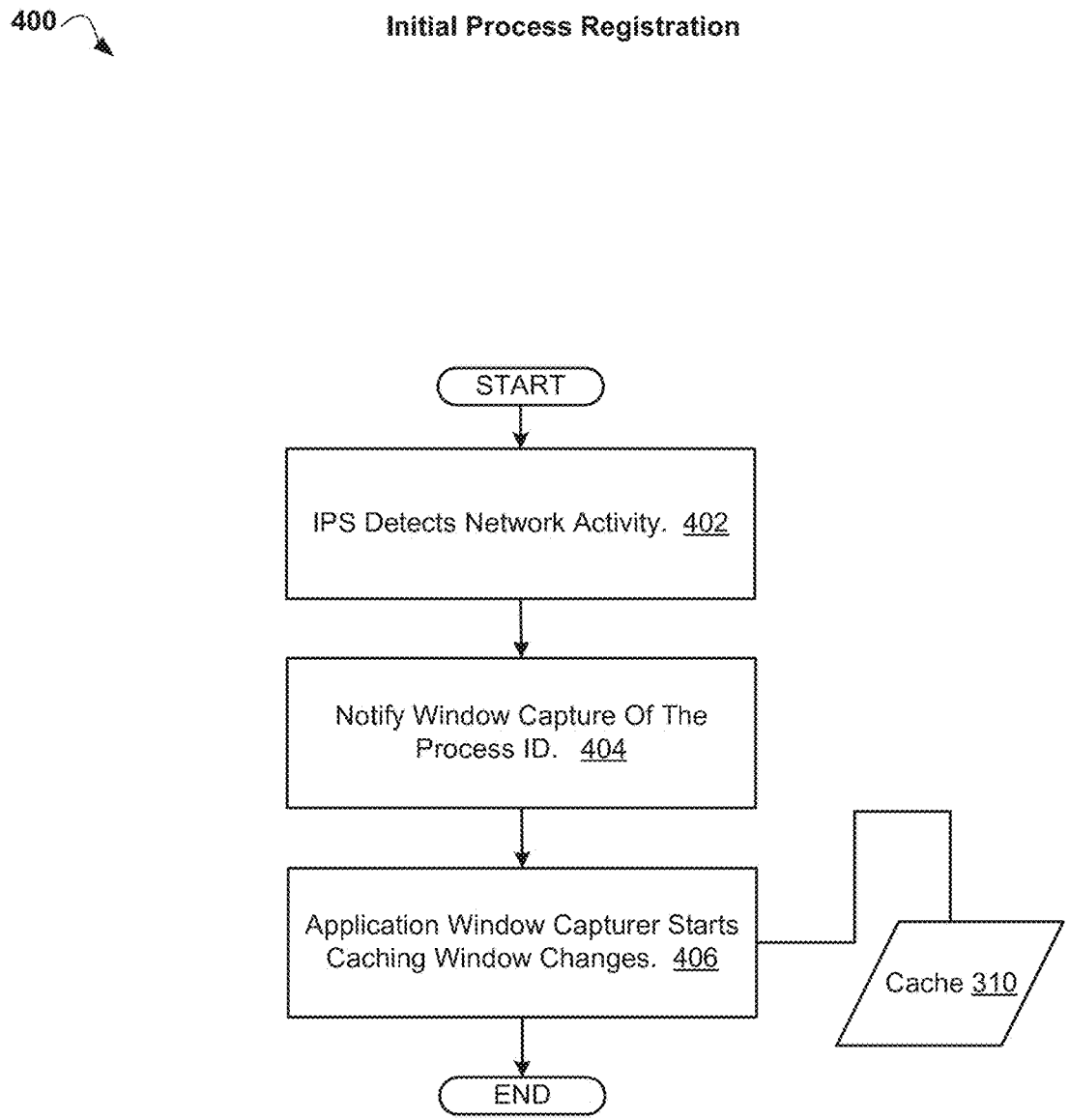
FIGS. 4A-4B is an operational flowchart illustrating the steps carried out by a program to augment IPS/SIEM Evidence according to at least one embodiment.
Figure 4B:
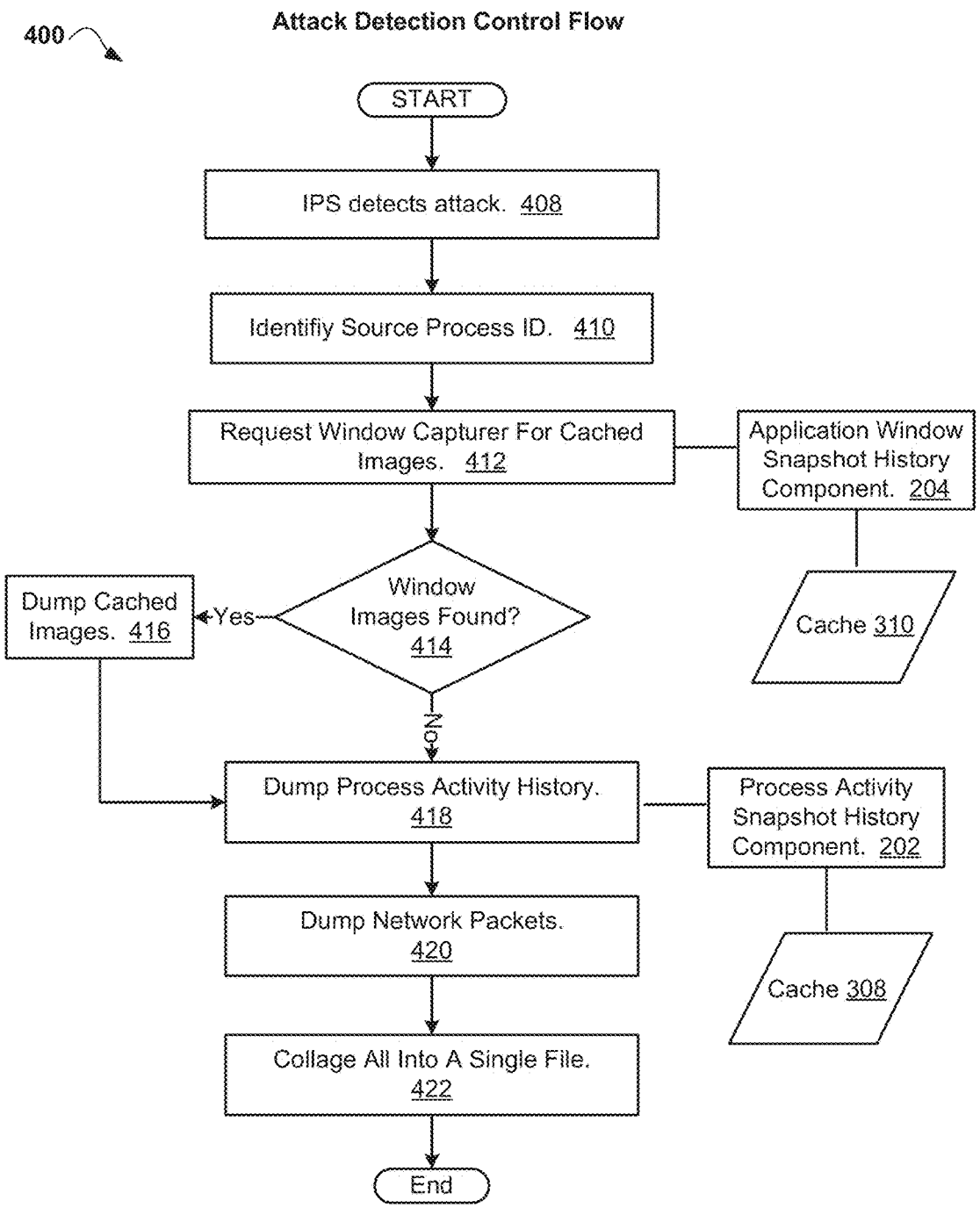

Referring now to FIGS. 4A-4B, an operational flowchart 400 illustrating the steps carried out by an Augmenting IPS/SIEM Evidence Program in accordance with one embodiment is depicted. As previously described, the Augmenting IPS/SIEM Evidence Program 116A, 116B (FIG. 1) may augment endpoint IPS with two components (a Process Snapshot History Component 202 (FIG. 2) and a Screen Capture Snapshot History Component 204 (FIG. 2)) that monitor, routinely capture and store in a cache application window content for programs with network activity and system process activity snapshot history information.

Therefore with respect to FIG. 4A, the initial process registration may begin at 402, when the IPS detects network activity. Then at 404, the Augmenting IPS/SIEM Evidence Program 116A, 116B (FIG. 1) may notify the Window Capture Component (i.e., the Application Window Snapshot History Component) 204 (FIG. 2) of the process ID. Then at 406, the Window Capturer Component 204 (FIG. 2) starts caching window changes 310.

With respect to FIG. 4B, an attack detection control flow illustrates at 408, that an IPS detects an attack. According to at least one implementation, when IPS detects a malicious packet from an application, it may, at 410, identify a source process ID and at 412, request the Window Capturer Component (i.e., the Application Window Snapshot History Component 204 (FIG. 2)) for cached images 310. As such, the present embodiment may request the Window Capturer 204 (FIG. 2) for the recorded process history and dump that along with the packet capture.

Then at 414, it may be determined whether any window images are found. If at 414, it is determined that a window image is found, then at 416, the cached images are dumped and the method proceeds to step 418 to dump process activity history.

However, if at 414 it is determined that no window images are found then the method will proceed directly to step 418 and the process activity snapshot history component (i.e., the process snapshot history component 202 (FIG. 2)) will dump the process activity history (i.e., cache 308).

Active processes in an OS have a corresponding Process Control Block (PCB) maintained and tracked by the OS kernel. The PCB maintains information about the state of the process and tracks its resources. As such the Process Activity Snapshot History component 202 may query the PCB dataset and routinely record its relevant contents into its cache memory. Then, the information captured and maintained will be akin to what is displayed by the top command in Linux and tasklist command in Windows. Since PCB info changes are incremental, delta algorithms can be employed to maximize cache memory utilization.

Then at 420, the method will dump network packets and collage them all into a single file at 422. As such, the present embodiment may collect a sequence of screen captures of windows of specific processes identified as having network activity such that a 'short video' of process window activity is recorded. This 'short video' may then be retrievable by IPS when necessary to be attached as evidence in the event of a detected attack. Similarly, a 'short video' of process activity is also recorded and the two can be correlated for analysis, if necessary.

Furthermore, as previously described, whenever the IPS/SIEM detects an attack, it can query these caches 308, 310 for the relevant process' information and attach the data together with the packet capture dump, packaging it all into a single binary large object (BLOB). Therefore, by correlating the IPS/SIEM events, network packets, screen captures and process history snapshots, security administrators may be well positioned to extrapolate the targets and consequences of attacks as well as providing supporting evidence.

It may be appreciated that FIG. 4A-4B provides only an illustration of one implementation and does not imply any limitations with regard to how different embodiments may be implemented. Many modifications to the depicted environments may be made based on design and implementation requirements.

The present embodiment may improve forensic data of detected attacks which may provide a clearer evidence of incidents. Such information can prove to be an invaluable asset in litigations since more complete information of attack's nature and composition can be used to develop a better and more comprehensive defense mechanism for a company. Furthermore the present embodiment may provide an extensive level of multi-dimensional evidence information and may improve product value proposition to customers. Additionally, the present embodiment may provide a solution that may be applicable to any security framework that is deployed on an endpoint—desktops, mobile devices and IoT devices that have a GUI as well as to any company who is involved in the security industry.

Also, the present embodiment may be utilized by any product that provides a host or endpoint security infrastructure. Therefore, a workstation security product or a server security product may be able to can incorporate the features described herein. For example, the product could be a desktop workstation, mobile device or any other network endpoint that employs a GUI as its user interface.

Figure 5:
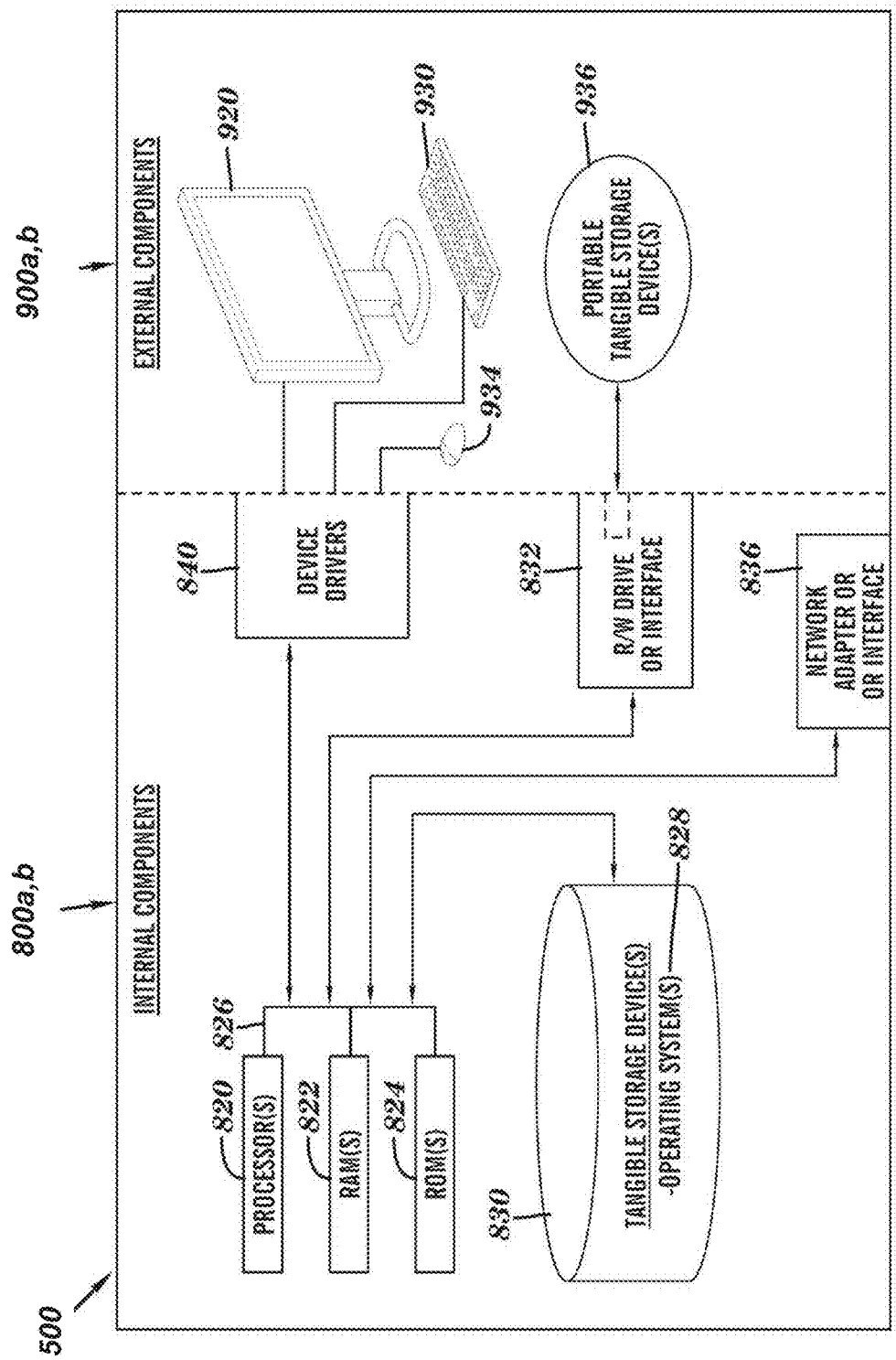
FIG. 5 is a block diagram of internal and external components of computers and servers depicted in FIG. 1 according to at least one embodiment.

FIG. 5 is a block diagram 500 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 800 *a,b* and external components 900 *a,b* illustrated in FIG. 5. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Augmenting IPS/SIEM Evidence Program 116A (FIG. 1) in client computer 102 (FIG. 1) and the Augmenting IPS/SIEM Evidence Program 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 *a,b* also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Augmenting IPS/SIEM Evidence Program 116A, 116B (FIG. 1) can be stored on one or more of the respective portable computer-readable tangible storage devices 936, read via the respective R/W drive or interface 832 and loaded into the respective hard drive 830.

Each set of internal components 800 *a,b* also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Augmenting IPS/SIEM Evidence Program 116A (FIG. 1) in client computer 102 (FIG. 1) and the Augmenting IPS/SIEM Evidence Program 116B (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Augmenting IPS/SIEM Evidence Program 116A (FIG. 1) in client computer 102 (FIG. 1) and the Augmenting IPS/SIEM Evidence Program 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900*a,b* can include a computer display monitor 920, a keyboard 930, and a computer mouse 934. External components 900*a,b* can also include touch screens, virtual keyboards, touch pads, pointing devices, and other human interface devices. Each of the sets of internal components 800*a,b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
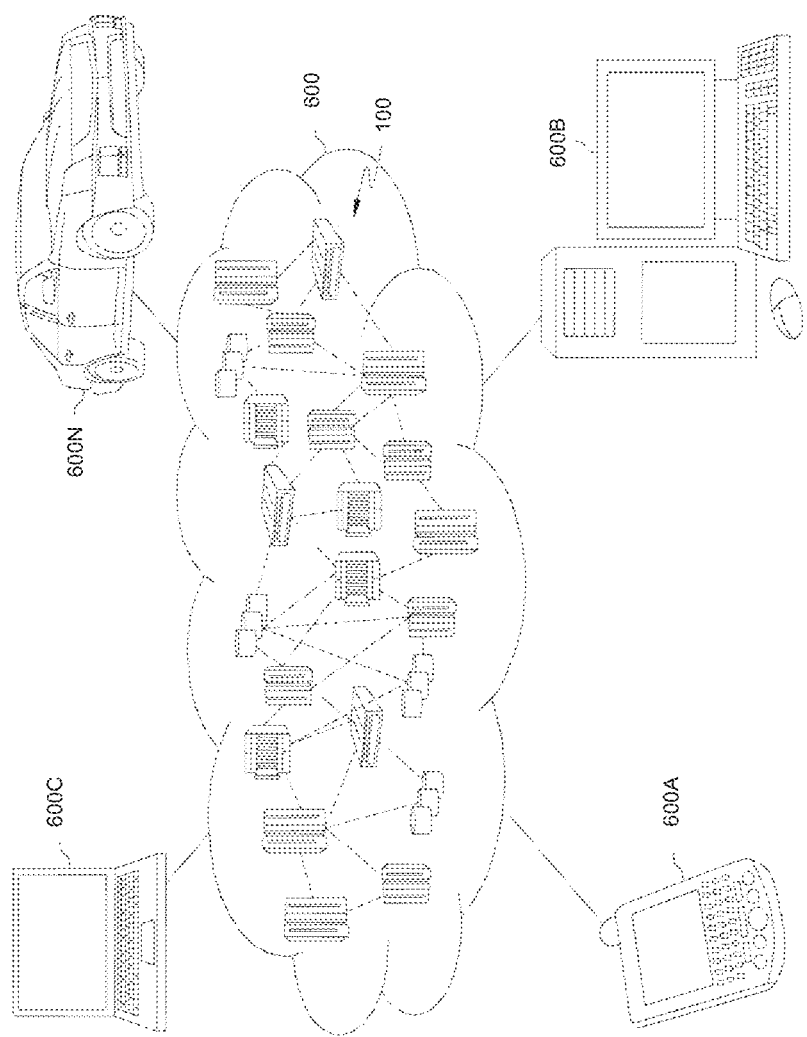
FIG. 6 is a block diagram of an illustrative cloud computing environment including the computer system depicted in FIG. 1, according to at least one embodiment.

Referring now to FIG. 6, illustrative cloud computing environment 600 is depicted. As shown, cloud computing environment 600 comprises one or more cloud computing nodes 100 with which local computing devices used by cloud consumers, such as, for example, personal digital assistant (PDA) or cellular telephone 600A, desktop computer 600B, laptop computer 600C, and/or automobile computer system 600N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 600A-N shown in FIG. 6 are intended to be illustrative only and that computing nodes 100 and cloud computing environment 600 can communicate with any type of computerized device over any type of network and/or network addressable connection (e.g., using a web browser).

Figure 7:
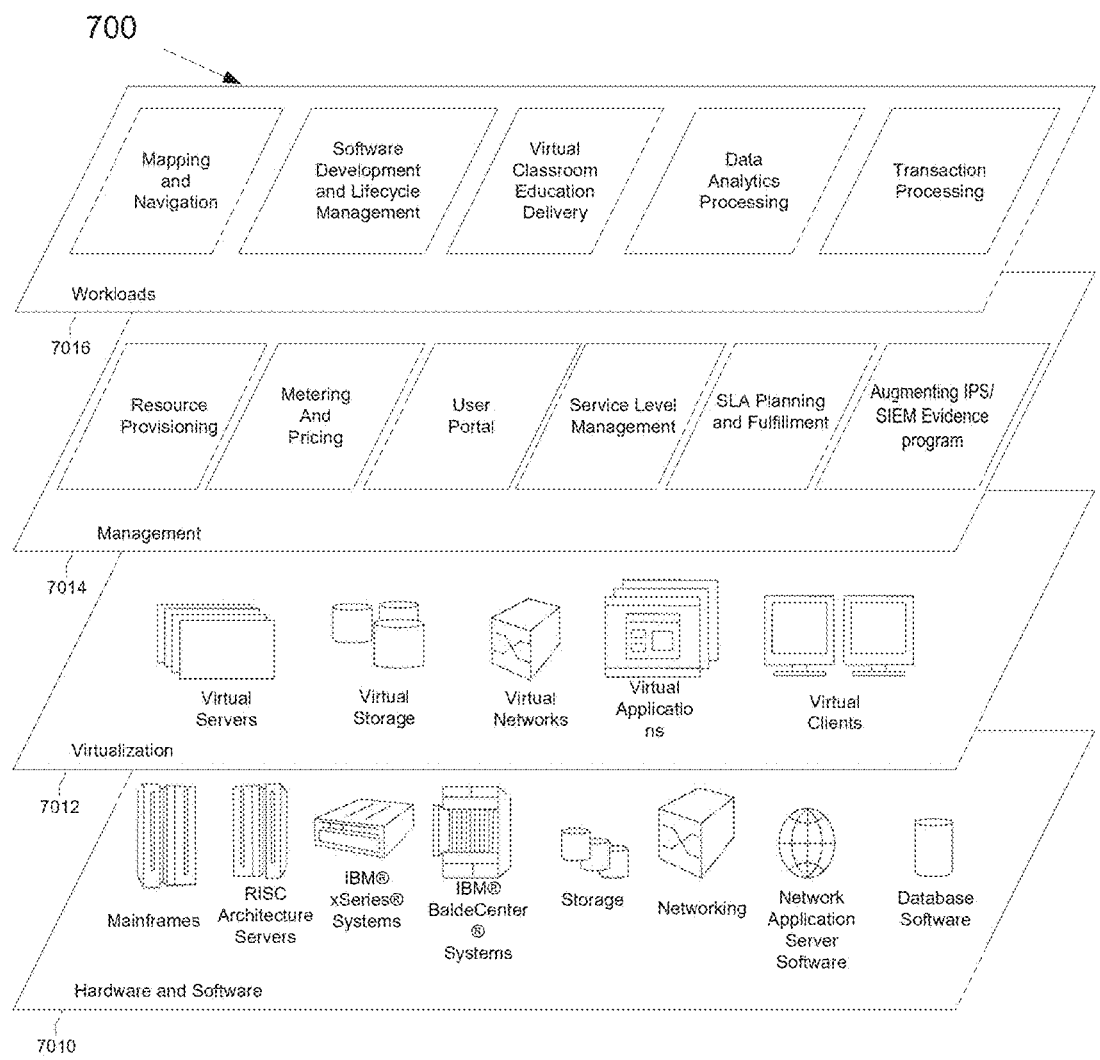
FIG. 7 is a block diagram of functional layers of the illustrative cloud computing environment of FIG. 6, according to at least one embodiment.

Referring now to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 7010 includes hardware and software components. Examples of hardware components include: mainframes; RISC (Reduced Instruction Set Computer) architecture based servers; storage devices; networks and networking components. In some embodiments, software components include network application server software.

Virtualization layer 7012 provides an abstraction layer from which the following examples of virtual entities may be provided: virtual servers; virtual storage; virtual networks, including virtual private networks; virtual applications and operating systems; and virtual clients.

In one example, management layer 7014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. An Augmenting IPS/SIEM Evidence Program may augment IPS/SIEM evidence information using a process history snapshot and an application window capture history.

Workloads layer 7016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    responsive to detecting network activity on an operating system (OS) process actively operating on a computer system, identifying, by the one or more computer processors, the OS process;

responsive to identifying the OS process, capturing, by the one or more computer processors, one or more graphical representations of each graphical user interface (GUI) window of the OS process;

responsive to identifying the OS process, recording, by the one or more computer processors, process activity of the OS process;

calculating, by the one or more computer processors, a weight for the OS process, wherein the weight for the OS process quantitatively indicates a risk level for network attacks on the OS process;

storing, by the one or more computer processors, a first file including a sequence of the one or more graphical representations of each GUI window of the OS process;

storing, by the one or more computer processors, a second file including the process activity of the OS process, wherein the first file and the second file are video files retrieved by an intrusion prevention software/security information and event management software (IPS/SIEM), and wherein the packet information is a packet capture dump and event information is IPS/SIEM event information, and wherein the steps of storing the first file and the second file comprise:

allocating, by the one or more computer processors, a number of storage resources in a storage repository to store the first file, based on the calculated weight for the OS process whereby a first OS process having a greater calculated weight is allocated a greater number of storage resources in the storage repository to store the first file compared to a second OS process having a lesser calculated weight; and allocating, by the one or more computer processors, a number of storage resources in the storage repository to store the second file, based on the calculated weight for the OS process, whereby the first OS process having the greater calculated weight is allocated a greater number of storage resources in the storage repository to store the second file compared to the second OS process having the lesser calculated weight;

responsive to detecting a network attack, retrieving, by the one or more computer processors, the first file and the second file;

attaching, by the one or more computer processors, the first file and the second file together with packet information and event information into a single Binary Large OBject (BLOB), wherein the single BLOB is a collection of binary data stored as a single entity in a database management system; and sending, by the one or more computer processors, an electronic notification of the single BLOB to a management console associated with the computer system.

2. The method of claim 1, wherein the one or more graphical representations of each GUI window of the OS process is a screen capture of each GUI window of the OS process, including one or more delta algorithms describing changes between each GUI window.

3. The method of claim 1, wherein the step of calculating the weight for the OS process comprises:

determining, by the one or more computer processors, process parameters for the OS process, wherein one of the process parameters for the OS process indicates a number of network sockets opened for OS process; and calculating, by the one or more computer processors, the weight for the OS process based on the process parameters for the OS process.

4. The method of claim 3, wherein one of the process parameters of the OS process includes an indication whether the OS process receives a user input.

* * * * *